June 3, 1958     T. B. H. VOGT     2,836,900
MAGNETIZED ANGLE MEASURING LEVELS
Filed Dec. 7, 1955
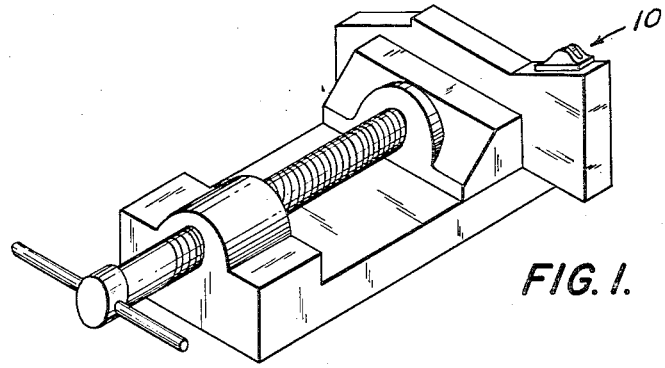
FIG. 1.
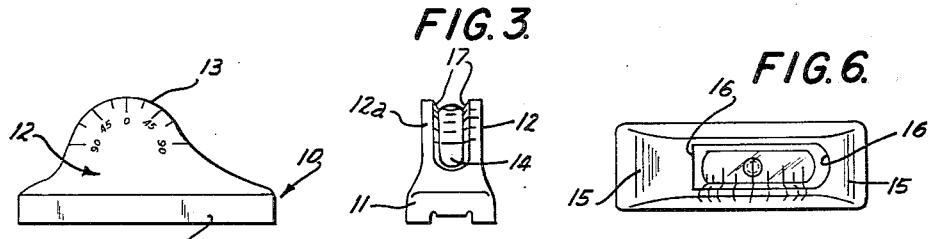
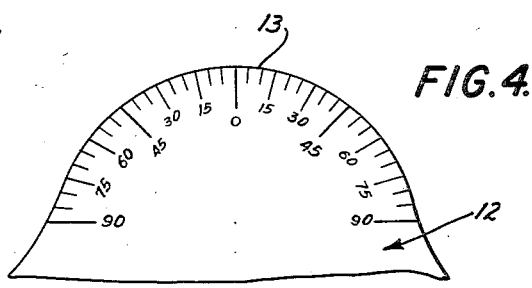
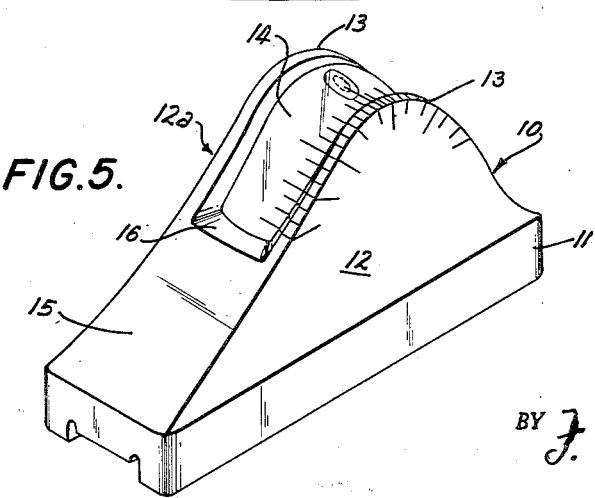
INVENTOR.
T. B. H. VOGT
BY *F. Ledermann*
ATTORNEY

2,836,900
MAGNETIZED ANGLE MEASURING LEVELS

Theodore B. H. Vogt, Fair Lawn, N. J.

Application December 7, 1955, Serial No. 551,669

1 Claim. (Cl. 33—212)

This invention relates generally to bubble levels, and the main object of the invention is the provision of a level enclosed in a housing having a permanently magnetized base or a permanently magnetized portion of the base, the housing including parallel upright walls defining a receptacle or recess in which a transparent hollow circular liquid container is fixedly positioned on edge, with the further provision of angle graduations whereby, when the level is applied to any surface of a machine, it will cling to the metal of the machine and the angle of inclination of the surface is directly readable on the device.

The above board as well as additional and more specific objects will be clarified in the following description wherein reference numerals refer to like-numbered parts in the accompanying drawing. It is to be noted that the drawing is intended solely for the purpose of illustration and that it is therefore neither desired nor intended to limit the invention necessarily to any or all of the exact details of construction shown or described except insofar as they may be deemed essential to the invention.

Referring briefly to the drawing, Fig. 1 is a perspective view showing, merely by way of a single example, a piece of metallic machinery having the level of the present invention applied thereto.

Fig. 2 is a side elevational view of the level per se.

Fig. 3 is an elevational view of the same, as seen from either end thereof.

Fig. 4 is a fragmentary enlarged side elevational view of the same.

Fig. 5 is a perspective view of the level of the present invention, with the graduations thereon provided in a modified relationship with respect to the device.

Fig. 6 is a plan view of the level of Fig. 5.

Referring in detail to the drawing, the numeral 10 indicates the housing of the level, including the base 11 which may be formed wholly of magnetized steel or the like, or any part of the lower surface of the base may be so provided. Opposed longitudinal and flat walls 12 and 12a rise from the base 11, having at least their upper or uppermost portions 13 rounded to form aligned semicircles of the same radius. A hollow transparent circular disc-shaped sealed receptacle 14 is positioned on edge between the walls 12 and 13, in axial alignment with the rounded wall portions 12 and 12a. Transverse walls 15 at the ends of the device, sloping upward to form sills 16 for the "window" thus formed together with the walls 12 and 12a for the receptacle 14, are further provided. In actual manufacture of the device, however, the portion of the housing 10 above the base 11 would be molded or otherwise formed in a unit with the base, and the said upper portion of the housing is preferably made of a light-weight non-magnetic material such as, for example, any suitable plastic material, and of course the base is permanently secured or locked thereto, in any suitable manner or by any suitable means, not shown.

The level may be provided with suitable angle-measuring graduations in a number of ways. For example, such graduations may be provided as shown in Fig. 3, across both beveled edges 17 on the side walls 12 and 12a and, additionally, on the exposed surface of the receptacle 14, and. additionally if desired, on either of the walls 12 or 12a, or both, as shown in Figs. 2, 4, and 5. The essential requirement is that the angle graduations be readily visible to the user of the device.

Thus the level may be readily used on any machine or portion thereof, not only to determine whether the surface to which it is applied is horizontal but also to enable the user to determine instantly the angle of the surface with respect to the horizontal.

I claim:

A spirit level comprising a flat magnetized base having upwardly and inwardly sloping end walls and upwardly extending parallel side walls, said side walls having the portions thereof between said end walls extending upward a substantial distance above said end walls and having aligned convex semi-circular edges blending at their extremities with the upper edges of said end walls, said side walls together with said upper edges of the end walls providing a recess, a disc-shaped transparent hollow receptacle registering on edge on said base in said recess and having a smaller diameter than the diameter of said semi-circular edges of the side walls, said receptacle thereby having a portion of the edge thereof exposed between said side walls and positioned radially inward from said semi-circular edges, the receptacle being partly filled with a liquid thereby providing an air bubble therein, and angle graduations on the semi-circular edges of said side walls.

References Cited in the file of this patent
UNITED STATES PATENTS

| 385,516 | Hutton | July 3, 1888 |
| 800,739 | Grosser | Oct. 3, 1905 |
| 807,873 | Sharp | Dec. 19, 1905 |
| 1,059,396 | Russell | Apr. 22, 1913 |
| 2,541,880 | McMillan et al. | Feb. 13, 1951 |
| 2,568,143 | Casper | Sept. 18, 1951 |

FOREIGN PATENTS

| 280,539 | Switzerland | May 1, 1952 |